United States Patent
Fujimoto (10) Patent No.: US 7,363,252 B2
(45) Date of Patent: Apr. 22, 2008

(54) MOBILE TELEPHONE

(76) Inventor: Takashi Fujimoto, 25-25, Midorimachi 6-chome, Kita-ku, Kobe-shi, Hyogo 651-1221 (JP)

(*) Notice: Subject to any disclaimer, the term of this patent is extended or adjusted under 35 U.S.C. 154(b) by 279 days.

(21) Appl. No.: 10/381,658

(22) PCT Filed: Aug. 3, 2001

(86) PCT No.: PCT/JP01/06709

§ 371 (c)(1),
(2), (4) Date: Mar. 28, 2003

(87) PCT Pub. No.: WO02/27587

PCT Pub. Date: Apr. 4, 2002

(65) Prior Publication Data

US 2003/0177068 A1  Sep. 18, 2003

(30) Foreign Application Priority Data

Sep. 28, 2000 (JP) ............................ 2000-295649
Nov. 27, 2000 (JP) ............................ 2000-358740

(51) Int. Cl.
*G06Q 30/00* (2006.01)
(52) U.S. Cl. ................. 705/26; 705/41; 705/18; 455/414.1; 455/556.1; 455/557; 455/344
(58) Field of Classification Search ............ 455/414.1, 455/457, 567, 419, 186.1; 340/5.2, 5.4; 725/13; 705/2, 90, 26, 41; 379/93.12
See application file for complete search history.

(56) References Cited

U.S. PATENT DOCUMENTS 5,625,877 A * 4/1997 Dunn et al. ................. 455/454
5,646,604 A * 7/1997 Maruyama et al. ........ 340/5.22
5,890,128 A * 3/1999 Diaz et al. ..................... 705/2
5,923,735 A * 7/1999 Swartz et al. ............ 379/93.12
5,986,565 A * 11/1999 Isaka ......................... 340/5.42
6,078,806 A   6/2000 Heinonen et al.
6,091,956 A   7/2000 Hollenberg
6,144,848 A * 11/2000 Walsh et al. ................. 455/419

(Continued)

FOREIGN PATENT DOCUMENTS

EP    0 950 968 A1    2/1999

(Continued)

*Primary Examiner*—Philip J. Sobutka
*Assistant Examiner*—Dominic E. Rego
(74) *Attorney, Agent, or Firm*—Birch, Stewart, Kolasch & Birch, LLP (57) ABSTRACT

A portable telephone including a transmission and reception unit, a control unit, a speaker, a display unit, a code reader unit, an operation input section, a microphone and a storage unit. The storage unit includes a telephone number memory, a password-data memory, and a personal-attribute memory. A buyer scans a code, in which product information is encoded, using the code reader unit, and enters password data via the operation input section. The control unit performs a comparison of the entered password data and password data previously stored in the password-data memory. After the comparison, the transmission and reception unit transmits via an antenna the product information, the telephone number stored in the telephone number memory, and personal-attribute data stored in the personal-attribute memory to a mobile telephone company. The transmitted information is used in settlement of the sales amount.

20 Claims, 7 Drawing Sheets

U.S. PATENT DOCUMENTS

| | | |
|---|---|---|
| 6,467,089 B1 * | 10/2002 | Aust et al. .................... 725/13 |
| 6,587,835 B1 | 7/2003 | Treyz et al. |
| 6,868,391 B1 * | 3/2005 | Hultgren ....................... 705/26 |
| 2001/0037316 A1 * | 11/2001 | Shiloh ........................ 705/74 |
| 2002/0008145 A1 * | 1/2002 | Walsh et al. ........... 235/462.46 |
| 2002/0071076 A1 * | 6/2002 | Webb et al. ................ 349/117 |

FOREIGN PATENT DOCUMENTS

| | | | |
|---|---|---|---|
| EP | 0 950 968 | | 10/1999 |
| JP | 08-016740 | | 1/1996 |
| JP | 8-50628 A | | 2/1996 |
| JP | 09-116960 | | 5/1997 |
| JP | 09-149117 | * | 6/1997 |
| JP | 11-184297 A | | 7/1999 |
| JP | 11-184947 | | 7/1999 |
| JP | 11-203358 | | 7/1999 |
| JP | 11-345264 | | 12/1999 |
| JP | 2000-132605 A | | 5/2000 |
| JP | 2000-242723 A | | 9/2000 |
| JP | 2000-244611 | * | 9/2000 |
| KR | 2000-0044466 A | | 7/2000 |
| KR | 10-20000054339 A | | 9/2000 |

* cited by examiner

MOBILE TELEPHONE

This application is the national phase under 35 U.S.C. § 371 of PCT International Application No. PCT/JP01/06709 which has an International filing date of Aug. 3, 2001, which designated the United States of America.

FIELD OF THE INVENTION

The present invention relates to mobile telephone apparatuses such as portable telephones, PHS terminals (Personal Handyphone System), car telephones, compact computers provided with a telephone function, and so on.

BACKGROUND ART

When buyers purchase goods, credit cards and debit cards are used as means for settling the sales amount in stores, without handing over cash.

In the case where a credit card is used when purchasing goods in a store, the buyer presents a credit card in which individual-identifying data (data specifying a bank account for settling the sales amount, etc.) is magnetically recorded. The sales clerk reads this magnetic data in the credit card by using a card reading device and inputs the sale amount by using a keyboard attached to the card reading device. Then, the sales clerk compares the signature given by the buyer and the signature already signed on the credit card. After performing this process, a sales amount transfer instruction or the like is carried out by computer systems including a computer of the credit card company, which is connected to the card reading device via a public telephone line, and a bank computer. In this case, the processing in the store and actual payment of the sales amount are performed on different days.

In the case where a debit card is used when purchasing goods in a store, the buyer presents a debit card in which individual-identifying data (data specifying a bank account for settling the sales amount, etc.) is magnetically recorded. The sales clerk reads this magnetic data in the debit card by using a card reading device and inputs the sale amount by using a keyboard attached to the card reading device. Then, the buyer enters his or her password data using the above-mentioned keyboard or the like. After performing these processes, sale amount confirmation and prompt payment of the sale amount are carried out by a bank computer, which is connected to the card reading device via a public telephone line.

In the case where a credit card is used, since individual-identifying data is magnetically recorded in the credit card, it is easy for a third party to find out this data. Also, sometimes the comparison of the signatures in the store is not carried out, and even if a comparison is performed, there is a possibility that comparison errors occur due to the fact that the comparisons are sometimes carried out by sales clerks who have no expertise of such comparisons. Furthermore, the security of the card reading devices is not considered to be sufficient. Therefore, buyer security cannot be sufficiently guaranteed and forgery and fraudulent use of credit cards sometimes occur, and thus there is a risk of unforeseen losses occurring.

Also in the case where a debit card is used, since individual-identifying data is magnetically recorded in the debit card, it is easy for a third party to find out this data. Moreover, when inputting the password number in the store, it is also easy for a third party to find out this password number. Furthermore, the security of the card reading device is not considered to be sufficient. Therefore, forgery and fraudulent use of debit cards sometimes occur, and, of course, there is a risk of unforeseen losses occurring. In particular, in the case where a debit card is used, since settlement of the sale amount is performed immediately, once forgery or fraudulent use takes place, it is almost impossible to prevent losses based on this from occurring.

In recent years, mobile telephone apparatuses such as portable telephones and so forth have rapidly come into widespread use. Individuals have a strong sense of ownership for these mobile telephone apparatuses. Therefore, these mobile telephone apparatuses are convenient when used to settle the sales amount. In practice, various sales amount settlement methods using mobile telephone apparatuses are being proposed.

The present invention has been made in light of such circumstances, and has as an object the provision of a mobile telephone apparatus which is suitable for sales amount settlement.

SUMMARY OF THE INVENTION

In order to realize the above-mentioned objects, the present invention provides a mobile telephone apparatus comprising an operation input section, a storage unit in which password data is stored, and a control unit for determining whether password data entered from the operation input section and the password data stored in the storage unit match.

In this mobile telephone apparatus, the control unit determines whether the password data entered from the operation input section and the password data stored in the storage unit match. Therefore, this mobile telephone apparatus can be used in online settlement where authentication of individuals is required. Moreover, since mobile telephone apparatuses are regularly used by users, if the user loses his or her mobile telephone apparatus, it is likely that this would be noticed relatively quickly. Therefore, the loss would not go unnoticed for a long period of time, as with a credit card or debit card, and there is thus no possibility of losses becoming large during that period as a result of fraudulent use.

In order to realize the above-mentioned objects, another aspect of the invention provides a mobile telephone apparatus comprising an operation input section, a code reader unit for scanning encoded product information, a storage unit in which password data is stored, a control unit for determining whether password data entered from the operation input section and the password data stored in the storage unit match, and a transmission and reception unit which transmits to a mobile telephone company the product information and individual-identifying information on condition that both pieces of password data match.

In a sales amount settlement method in which this mobile telephone apparatus is used, first a participating store selling products (services are also included) provides encoded product information (for example, a participating store number, product numbers, and so on). The user of the mobile telephone apparatus (who is also a buyer) scans the product information with the code reader unit.

Next, the user enters password data via the operation input section. Thereupon, the control unit determines whether the entered password data and password data stored in the storage unit match. Then, the transmission and reception unit transmits the product information and the individual-identifying information to the mobile telephone company only when both pieces of password-data match. The transmitted information is used in sales amount settlement, which will be described later. With this mobile telephone apparatus, since the product information is scanned with the code reader unit, entry of the product information is easy and reliable. Moreover, since it is checked that both pieces of password data are identical using the control unit, fraudulent use of the mobile telephone apparatus can be prevented. Moreover, since the mobile telephone apparatus is used regularly by the user, if the user loses the mobile telephone apparatus, this is likely to be noticed relatively quickly. Therefore, the loss would not go unnoticed for a long period of time, as with a credit card or debit card, and there is thus no possibility of losses becoming large during that period as a result of fraudulent use. Furthermore, since settlement is done in a store without the mobile telephone being touched by another person, disclosure of the password data is also extremely rare.

As a concrete example of the individual-identifying information, a telephone number may be used. The individual-identifying information may be entered each time via the operation input section; however, in view of ease of use, it is preferable to store it in the storage unit.

Preferably, personal-attribute data is stored in the storage unit. The transmission and reception unit transmits the product information, the individual-identifying information, and the personal-attribute data to the mobile telephone company. The mobile telephone company maintains information concerning purchase restriction information or the price which is selected according to the personal attributes. Then, the mobile telephone company determines purchase restrictions according to this information and the personal-attribute data, or it selects the sales price.

The control unit of the mobile telephone apparatus may perform a comparison of the purchase restriction information and the personal-attribute data. In this case, the purchase restriction information, based on the personal attributes, is included in the product information scanned by the code reader unit. The control unit determines whether or not there are any purchase restrictions. Then, the transmission and reception unit transmits the product information and the individual-identifying information to the mobile telephone company only when the purchase is not restricted, and then settlement is performed. Therefore, it is possible to carry out transactions for products having purchase restrictions based on the personal-attribute data, such as age, gender, and so on.

In order to realize the above-mentioned objects, another aspect of the invention provides a mobile telephone apparatus comprising an operation input section, a storage unit in which password data is stored, a control unit for determining whether password data entered from the operation input section and the password data stored in the storage unit match, and a display unit for displaying coded individual-identifying information on condition that both pieces of password data match.

In the sales amount settlement method in which this mobile telephone apparatus is used, first on the shop floor of a participating store which sells products (services are also included), a user (who is also a buyer) enters password data via the operation input section. Thereupon, the control unit determines whether the entered password data and the password data stored in the storage means match. Then, the display unit displays the encoded individual-identifying information only when both pieces of password data match. The displayed individual-identifying information is scanned using a code reader in the store, and is then transmitted to a data center. The transmitted information is used in sales amount settlement, which is described later. With this mobile telephone apparatus, since matching of both pieces of password data is checked by the control unit, fraudulent use of the mobile telephone apparatus can be prevented. Moreover, since the mobile telephone apparatus is regularly used by the user, if the user loses his or her mobile telephone apparatus, it is likely that this would be noticed relatively quickly. Therefore, the loss would not go unnoticed for a long period of time, as with a credit card or debit card, and there is thus no possibility of losses becoming large during that period as a result of fraudulent use. Furthermore, since settlement is done in a store without the mobile telephone being touched by another person, disclosure of the password data is also extremely rare.

As a concrete example of the individual-identifying information, a telephone number may be used. The individual-identifying information may be entered each time via the operation input section; however, in view of ease of use, it is preferable to store it in the storage unit.

Preferably, the personal-attribute data is stored in the storage unit. This personal-attribute data is also encoded and displayed on the display unit, and is then scanned in the store. Purchase restrictions and price selection can be carried out based on this personal-attribute data.

BEST MODE FOR CARRYING OUT THE INVENTION

The present invention is described in detail below based on embodiments, with reference to the attached drawings.

Figure 1:
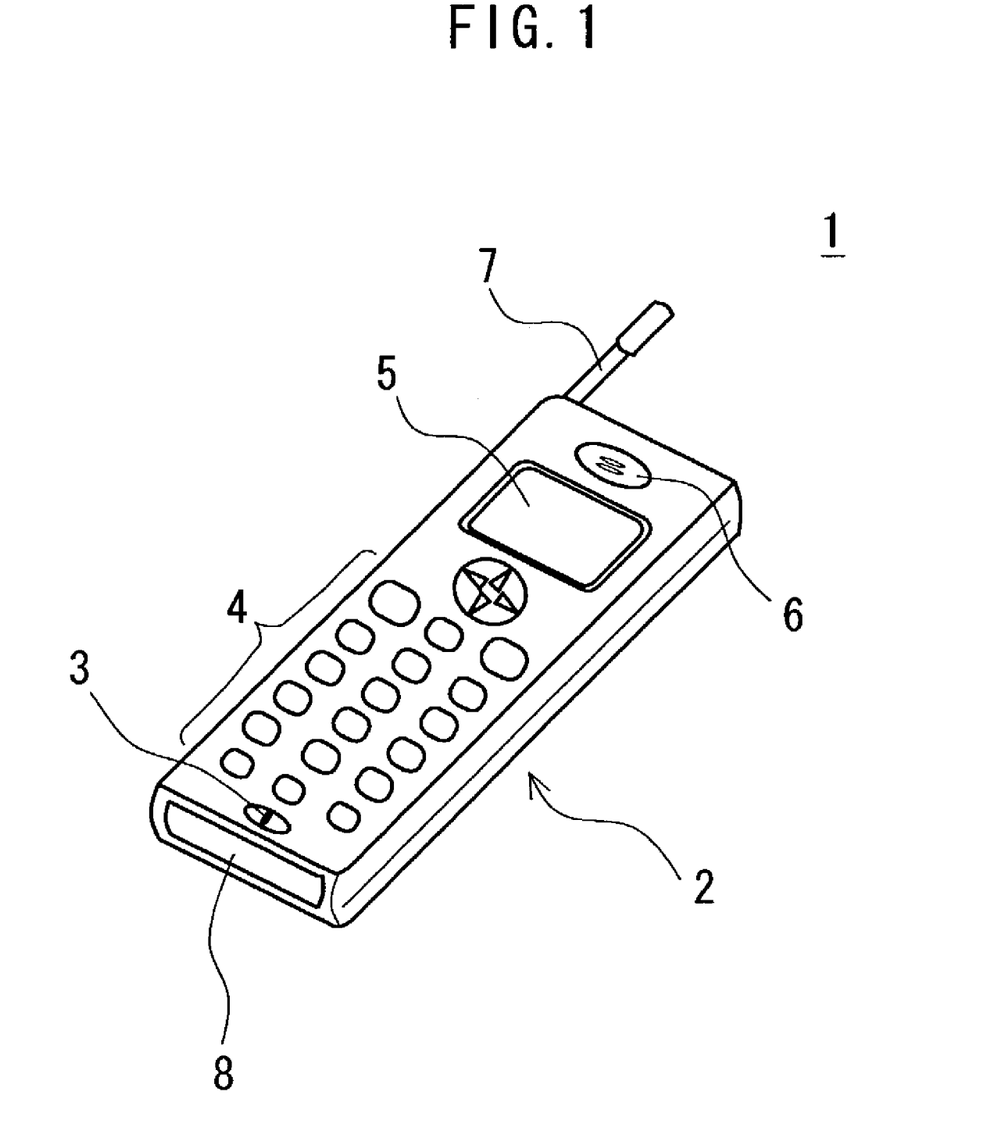
FIG. 1 is a perspective view in which a portable telephone, as a mobile telephone apparatus according to an embodiment of the present invention, is shown.

As shown in FIG. 1, a portable telephone 1, as a mobile telephone apparatus according to an embodiment of the present invention, is provided with a main body 2, a microphone 3, an operation input section 4 formed of a ten key or the like, a display unit 5 formed of a liquid crystal display or the like, a speaker 6, and an antenna 7 in the same manner as with conventional portable telephones. When making a telephone call, speech is input via the microphone 3. The operation input section 4 is used for entering password data, the telephone number of another party, and so on. The entered telephone number, information concerning the communicating party, a signal status, and the like are displayed on the display unit 5. Tones, the speech of the communicating party, and so on are output from the speaker 6. The antenna 7 is responsible for transmission and reception of radio waves.

This portable telephone 1 is also provided with a window 8. The window 8 is attached to a code reader unit (not shown in FIG. 1), which is installed in the main body 2. Incident light is emitted, via the window 8, from the code reader unit. This incident light reaches a code (something in which information is encoded) and is reflected therefrom. The reflected light then reaches the code reader unit, via the window 8. Product information which is included in the code is input into the portable telephone 1 by means of this reflected light.

Possible codes include bar codes, two dimensional codes in which the bar code extends in two dimensions (for example, those disclosed in Japanese Patent No. 2533439, Japanese Patent No. 2539744, Japanese Patent No. 2539745, and so forth) codes in which color information is added to these, and so on. Moreover, as concrete examples of the code reader unit, for example, a bar code reader and an identification-code reading device (those disclosed, for example, in Japanese Examined Patent Application Publication Number 8-16915, Japanese Examined Patent Application Publication Number 8-16916, Japanese Examined Patent Application Publication Number 8-21054, etc.) are possible. Since inputting the product code is done by means of the code reader unit, inputting is straightforward and input errors can be prevented.

Although this portable telephone 1 is provided with the code reader that is installed in the main body 2, a code reader unit that projects from the main body 2 is also permissible. Moreover, a code reader unit that projects by sliding out from the main body 2 may also be used. Furthermore, the antenna 7 may also be provided with a code reader unit at the tip thereof.

Figure 2:
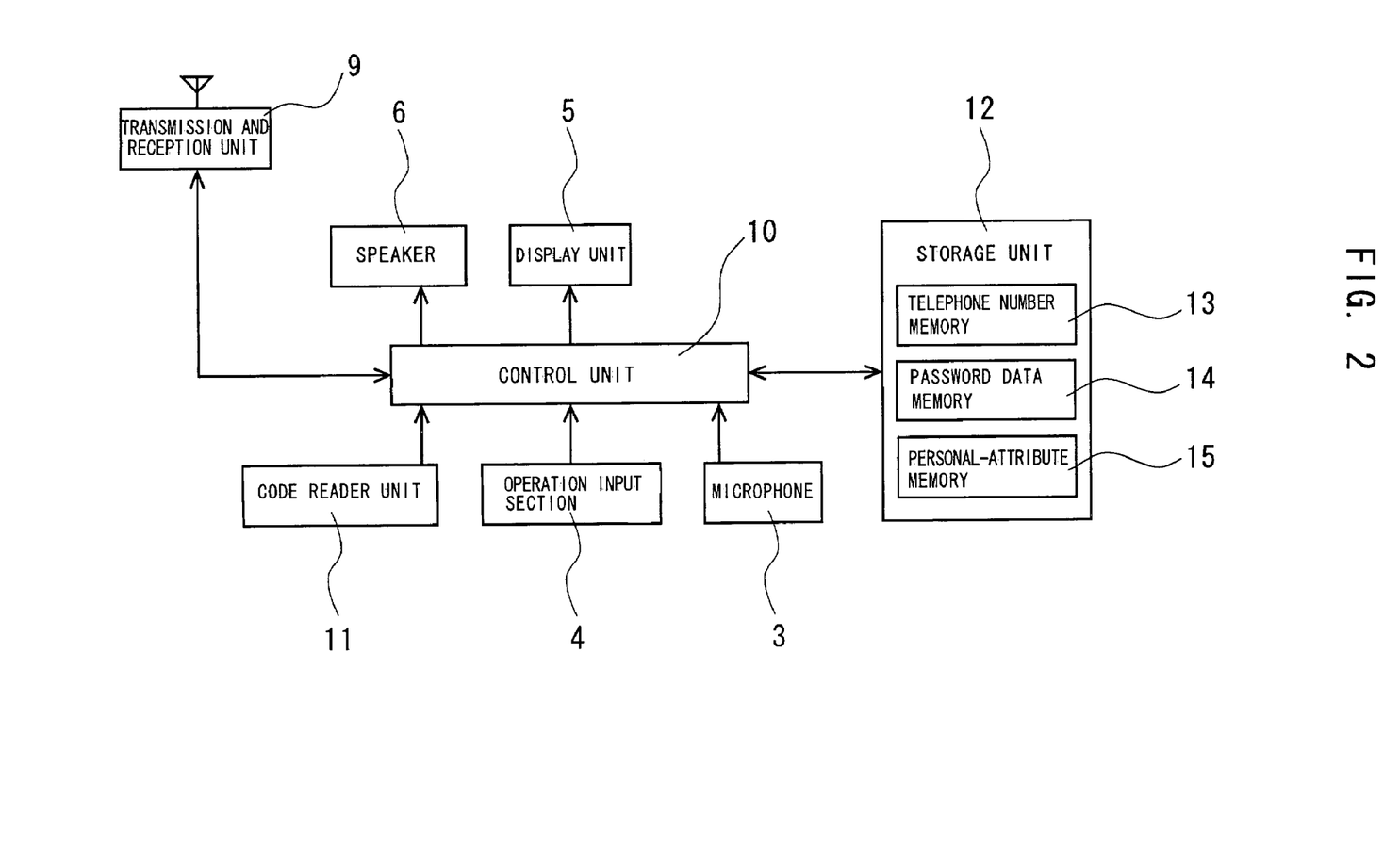
FIG. 2 is a block diagram in which the configuration of the portable telephone in FIG. 1 is shown.

FIG. 2 is a block diagram in which the configuration of the portable telephone 1 in FIG. 1 is shown. In this figure, a transmission and reception unit 9, a control unit 10, the speaker 6, the display unit 5, a code reader unit 11, the operation input section 4, the microphone 3, and a storage unit 12 are shown. The storage unit 12 is provided with a telephone number memory 13, a password data memory 14, and a personal attribute memory 15. Each of these memories 13, 14, and 15 is a memory whose contents cannot be overwritten (a ROM). The subscriber telephone number of the user is stored in the telephone number memory 13. This telephone number is individual-identifying information. The telephone number is stored by a mobile telephone company prior to the portable telephone 1 being delivered to the user. Password data (a password) is stored in the password-data memory 14. This password data is also stored by the mobile telephone company prior to the portable telephone 1 being delivered to the user. The portable telephone 1 may be designed so that this password data can be changed only when a default password data is input. Personal attribute data, such as gender, date of birth, and so forth, is stored in the personal attribute memory 15. Storage of this personal attribute data is performed by the mobile telephone company based on the information entered on an application form that the user filled out when making a contract with the mobile telephone company.

Figure 3:
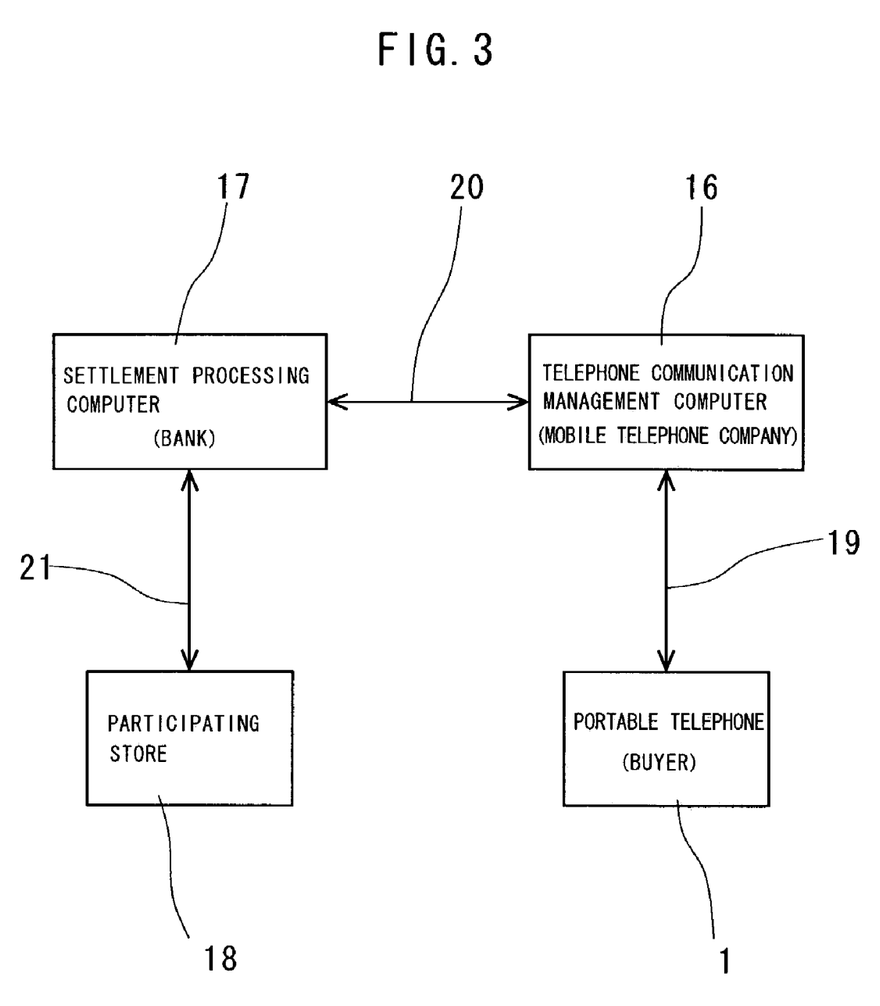
FIG. 3 is a conceptual diagram showing a sales amount settlement system in which the portable telephone in FIG. 2 is used.

FIG. 3 is a conceptual diagram showing a sales amount settlement system in which the portable telephone 1 in FIG. 2 is used. In this figure, the portable telephone 1, a telephone communication management computer 16 of the mobile telephone company, a settlement processing computer 17 of the bank, and a participating store 18 are shown. The user of the portable telephone 1 is a buyer who purchases a product by using this sales amount settlement system.

A bank account of the buyer is opened in the bank. Moreover, the settlement processing computer 17 of the bank holds a record of charge instructions for the account, determines whether or not it is possible to perform settlement corresponding to the charge instructions, reports on whether or not settlement is possible for the charge instructions, and so on.

The mobile telephone company provides a telephone line usage service, and the buyer makes use of this service according to the contract made with the mobile telephone company. A database in which a correspondence is established between the telephone number of the buyer and the bank account opened in the bank is stored in storage means (a hard disk or the like) in the telephone communication management computer 16 of the mobile telephone company. This database is formed on the basis of the details written on an automatic charge payment form which is submitted to the mobile telephone company by the buyer when a contract is made. Moreover, a database in which a correspondence is established between product numbers and prices is also stored in the storage means in the telephone communication management computer 16. Calculating means (a CPU or the like) of the telephone communication management computer 16 calculates telephone charges by adding up the outgoing telephone calls of the portable telephone 1, and is also provided with a function for periodically transmitting these telephone charges to the settlement processing computer 17 in the bank. In other words, the telephone charges which the buyer has to pay to the mobile telephone company are automatically paid from the bank account.

The participating store 18 provides products for customers. This participating store 18 includes not only people selling goods that are material objects, but also people providing services. This participating store 18 joins this system by paying a participation fee. As described later, the participating store 18 cooperates with a delivery company. The participating store 18 itself encodes information on the products which it sells and provides it as a code. Information on the participating store number, product numbers, and so on is included in this code. The codes are provided, for example, in a catalog or the like.

The portable telephone 1 and the telephone communication management computer 16 are connected by a private leased line 19, which provides a high degree of privacy. A packet communication line (for example, the "iMode" technology of NTT Mobile Communications, Inc.) or the like may be used as this private leased line 19. The telephone communication management computer 16 and the settlement processing computer 17 are connected together via a wired or wireless private leased line 20. Moreover, the settlement processing computer 17 and the participating store 18 are also connected together via a wired or wireless line 21 (preferably a private leased line). The connection between the settlement processing computer 17 and the participating store 18 may be realized via a bank (not shown in the drawing) which the participating store 18 deals with.

Figure 4:
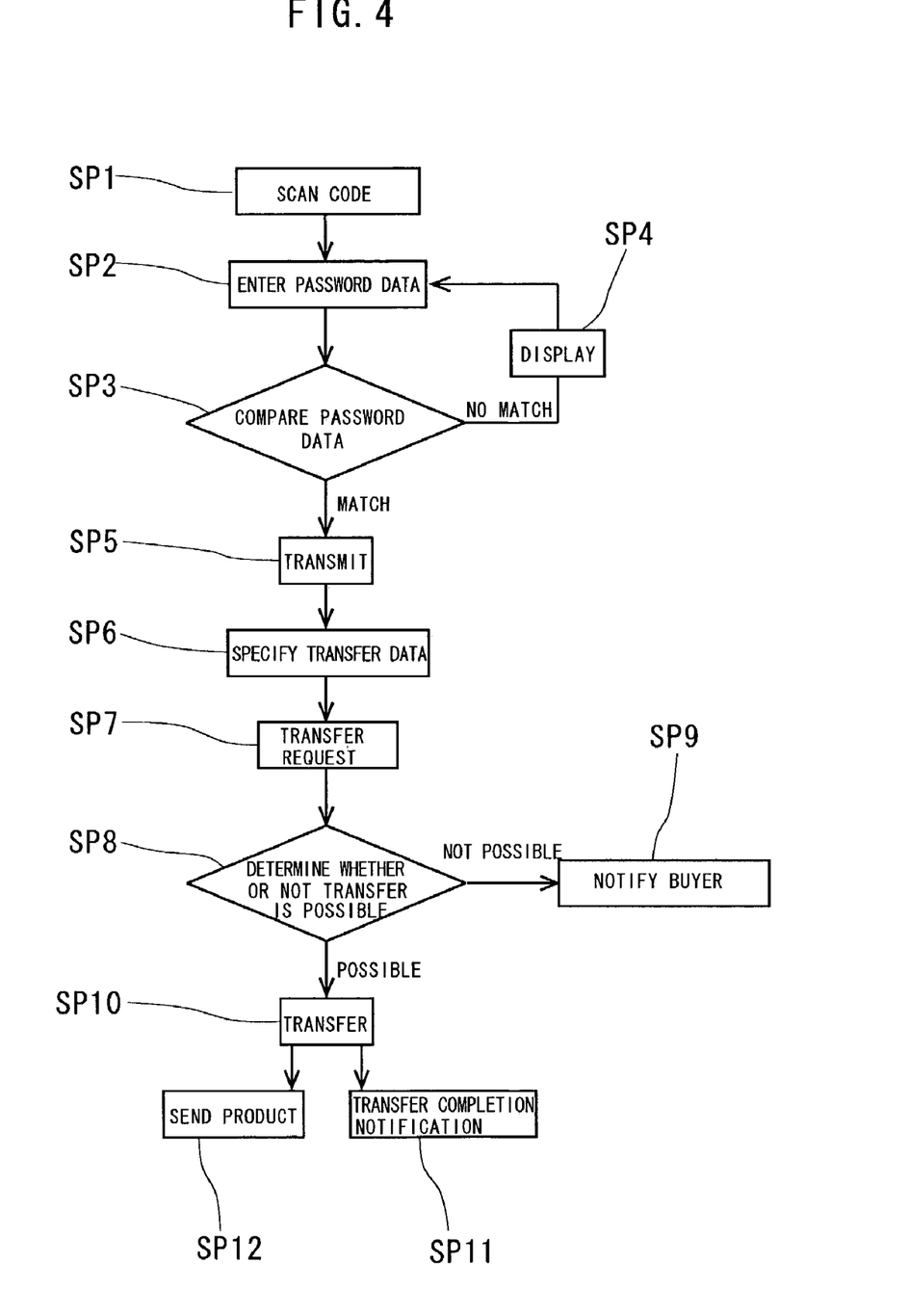
FIG. 4 is a flow chart showing a sales amount settlement method in which the portable telephone in FIG. 2 is used.

FIG. 4 is a flow chart showing a sales amount settlement method in which the portable telephone 1 of FIG. 2 is used. In this sales amount settlement method, first the buyer scans a code (in which product information is encoded) printed in a catalog issued by the participating store 18 by using the code reader unit 11 (SP1). The scanned data is transmitted to the control unit 10 (formed of a CPU or the like) via an interface (not shown), where it is temporarily stored. At the same time, in order to indicate that code scanning has been completed, the code itself or a message may be displayed on the display unit 5. Next, the buyer enters password data via the operation input section 4 (SP2). The control unit 10 compares the entered password data with password data stored in advance in the password-data memory 14 (SP3). If the password data does not match, a message to that effect is displayed on the display unit 5 of the portable telephone 1, and re-entry is prompted (SP4). The portable telephone 1 may be designed so that, if the number of erroneous entries reaches a predetermined number (for example, 3 times), further entry is not permitted. By comparing the password data, use of the portable telephone 1 by a person other than the owner can be prevented. Moreover, from the viewpoint of preventing disclosure, when the buyer enters the password data, it is preferable to arrange that the digits of the entered data are displayed only as symbols such as asterisks, for example.

After the password data is input correctly, the transmission and reception unit 9 transmits the product information to the telephone communication management computer 16 via the antenna 7 and the private leased line 19 (SP5). At this time, the telephone number of the buyer, which is stored in the telephone number memory 13, is also transmitted. Preferably, transmission is performed by means of a one-push button function installed in the portable telephone 1. By pressing this one-push button, the product information and the telephone number are sent together to the telephone communication management computer 16. Of course, the telephone number may be entered by the buyer each time. Furthermore, the portable telephone 1 may be designed such that, before transmission, information such as a product name and so forth is displayed on the display unit 5 of the portable telephone 1, and after the buyer has checked this, transmission is carried out by means of the one-push button.

After transmitting the telephone number, an order code, and so on, the calculating means of the telephone communication management computer 16 specifies transfer data based on the database stored in the storage means (SP6). The bank account of the buyer (the bank name, the branch name, the account number, and so on), the payment account of the participating store 18, the transfer amount (in other words, the price of the product), and so forth are included in this transfer data. The bank account of the buyer is specified on the basis of the telephone number, which is the individual-identifying information. Next, the telephone communication management computer 16 transmits the transfer data to the settlement processing computer 17 in the bank, via the private leased line, and executes a transfer request (SP7). Instead of the telephone communication management computer 16 of the mobile telephone company, the bank account of the buyer, the payment account of the participating store 18, and the transfer amount may be specified in the settlement processing computer 17 of the bank. In this case, the database in the storage means of the settlement processing computer 17 is used, instead of that in the telephone communication management computer 16.

The calculating means of the settlement processing computer 17, which receives the transfer request, checks the balance of the bank account of the buyer and, based on this, it determines whether or not it is possible to carry out the transfer (SP8). Then, if a transfer cannot be carried out for any reason, such as an insufficient balance, the settlement processing computer 17 reports that fact to the portable telephone 1 via the private leased line 20, the telephone communication management computer 16, and the private leased line 19 (SP9). If the transfer can be carried out, the settlement processing computer 17 gives a transfer instruction and a transfer to the participating store 18 is carried out via the line 21 (SP10).

After the transfer, the settlement processing computer 17 immediately transmits a transfer completion notification to the portable telephone 1 via the private leased line 20, the telephone communication management computer 16, and the private leased line 19 (SP11). Accordingly, the buyer can know, there and then, that the transfer has actually been completed, thus preventing double settlement.

After confirming the transfer, the participating store 18 sends the product to the buyer, for example, by consigning it to a delivery company (SP12). The delivery may be made to an address associated with the telephone number in advance, or it may be made to an address specified by the buyer at the order placing step (SP1).

In this sales amount settlement method, the telephone communication management computer 16 and the settlement processing computer 17 are connected to each other in advance in order to pay the telephone charges of the buyer. Therefore, provision of new infrastructure for payment settlement is not necessary. Moreover, since settlement is carried out by means of the highly secure portable telephone 1 and the private leased lines 19 and 20, secure transactions can be performed. Therefore, there is little need to encode the information, as in electronic settlement using the internet, for example. Moreover, since an individual is specified by means of a telephone number that is stored in advance in the telephone number memory 13 of the portable telephone 1, any effort required for the buyer to enter his or her account number and so on is eliminated. An individual may be specified by means of data other than a telephone number (for example, a subscriber ID).

It is also possible for the buyer to enter the sales amount via the operation input section 4 and for this sales amount, together with product information and individual-identifying information, to be transmitted from the portable telephone 1 to the telephone communication management computer 16. The telephone communication management computer 16 then compares the entered sales amount and a sales amount obtained from a database. Settlement is carried out only when they both match. Accordingly, the buyer can be prevented from mistakenly purchasing an expensive product that he or she did not intent to.

Obtaining the sales amount from the buyer may also be carried out in association with the automatic payment system for the telephone charges. In other words, when the telephone charges are billed, for example, every month, the sales amount may be added to this monthly amount. Accordingly, it is not necessary to build a new system for obtaining the sales amount from the buyer.

With this sales amount settlement method, the participating store 18 can obtain several advantages, including:
(1) expanded business opportunities by participating in this system,
(2) no need for stores etc. to provide equipment, and
(3) the lack of necessity to provide credit.

Therefore, it is possible for the mobile telephone company, for example, to collect from the participating store 18 a participation fee for these advantages. This participation fee may be income for the mobile telephone company, and all or part of it may be used to discount the telephone charges of the buyer. This discount normally depends on the level of usage of the portable telephone 1 and the level of usage of the sales amount settlement system. It is preferable to reduce the communication charges by this discounting because it will contribute to the adoption of portable telephones 1 by people with lower incomes or senior citizens and is useful for improving their well-being.

The advantages for portable telephone companies adopting this sales amount settlement method include improved added-value of their portable telephone 1 service. By combining sales amount settlement and communication services, it is expected that the number of portable telephone subscribers will increase.

The advantages for buyers adopting this sales amount settlement method include:

(1) making the purchase of goods safe by improving security, (2) removing the need to hand over cash in stores, and (3) allowing them to obtain a discount on their telephone charges.

The procedure of the sales amount settlement method is not limited to that shown in FIG. 1 and FIG. 2. For example, after obtaining a decision, by the settlement processing computer 17, that settlement is possible, only that information may be transmitted to the participating store 18 via the line. In that case, the transfer from the buyer's account to the participating store 18 is carried out after supplying the product.

Provision of the codes, functioning as product information, may be carried out by means other than a catalog. For example, it may be carried out on the shop floor of the participating store 18 by displaying them on an automatic vending machine, or at the gate of an establishment or toll road. Moreover, the product information may be provided in the form of a product number, rather than as an encoded code. In that case, the product information is entered via, for example, the operation input section 4 instead of via the code reader unit 11.

The mobile telephone company and the bank may be combined. In that case, a buyer account is established in the combined company, that is, in a mobile telephone company provided with a banking facility. Moreover, a system center provided with facilities combining distribution and financing may be established. This system center obtains finance information from the bank, telephone number information and so on from the mobile telephone company, and product information from the participating store 18. In this specification, the general term "mobile telephone company" includes both a mobile telephone company provided with a banking facility as well as a system center. Furthermore, a data center in which the mobile telephone company, the participating store 18, and the bank are connected by a line may be established, and settlement may be carried out via this data center.

The product information may include purchase restriction information, based on the personal attributes (age, gender, etc.). The restriction of tobacco sales to minors is one example of a purchase restriction. Since the date of birth is stored in the personal attribute memory 15 as personal attribute data, the control unit 10 calculates the age of the buyer based on this date of birth. Then it decides whether or not the purchase restrictions apply to the buyer (for example, whether he or she is an adult or a minor). Then, the product information is transmitted to the telephone communication management computer 16 only when the purchase restrictions do not apply to the buyer. If the purchase restrictions do apply, transmission of the product information and so forth to the telephone communication management computer 16 is prevented. Accordingly, the portable telephone 1 is prevented from being used for making sales by means of a catalog or automatic vending machine, even though these are forms of distribution where the buyer is not face to face with a sales clerk in a store.

It is also possible for the transmission and reception unit 9 to transmit the product information, the individual-identifying information, and the personal-attribute data to the telephone communication management computer 16, and for the telephone communication management computer 16 to perform comparison of the purchase restriction information and the personal-attribute data. In this case, a database for the purchase restriction information which is associated with the product number and the personal attributes is stored in the telephone communication management computer 16. The purchase restriction information may be included in the product information scanned by the code reader unit 11, and this purchase restriction information may be transmitted to the telephone communication management computer 16 each time. If the purchase restrictions apply, a notification to that effect is transmitted to the portable telephone 1 via the private leased line 19.

The telephone communication management computer 16 may possess information concerning prices (hereinafter also referred to as "price selection information"), which is selected according to the personal attributes. Concrete examples of the price selection information include discount information for the price that applies to the elderly, discount information for the price that applies to people with physical disabilities, discount information for the price that applies to women, and so forth. The price selection information may be stored in advance as a database in the telephone communication management computer 16, or it may be included in the product information scanned by the code reader unit 11. The telephone communication management computer 16 selects the settlement sales amount according to the personal attributes, based on the price selection information and the personal attribute data transmitted from the portable telephone 1.

Figure 5:
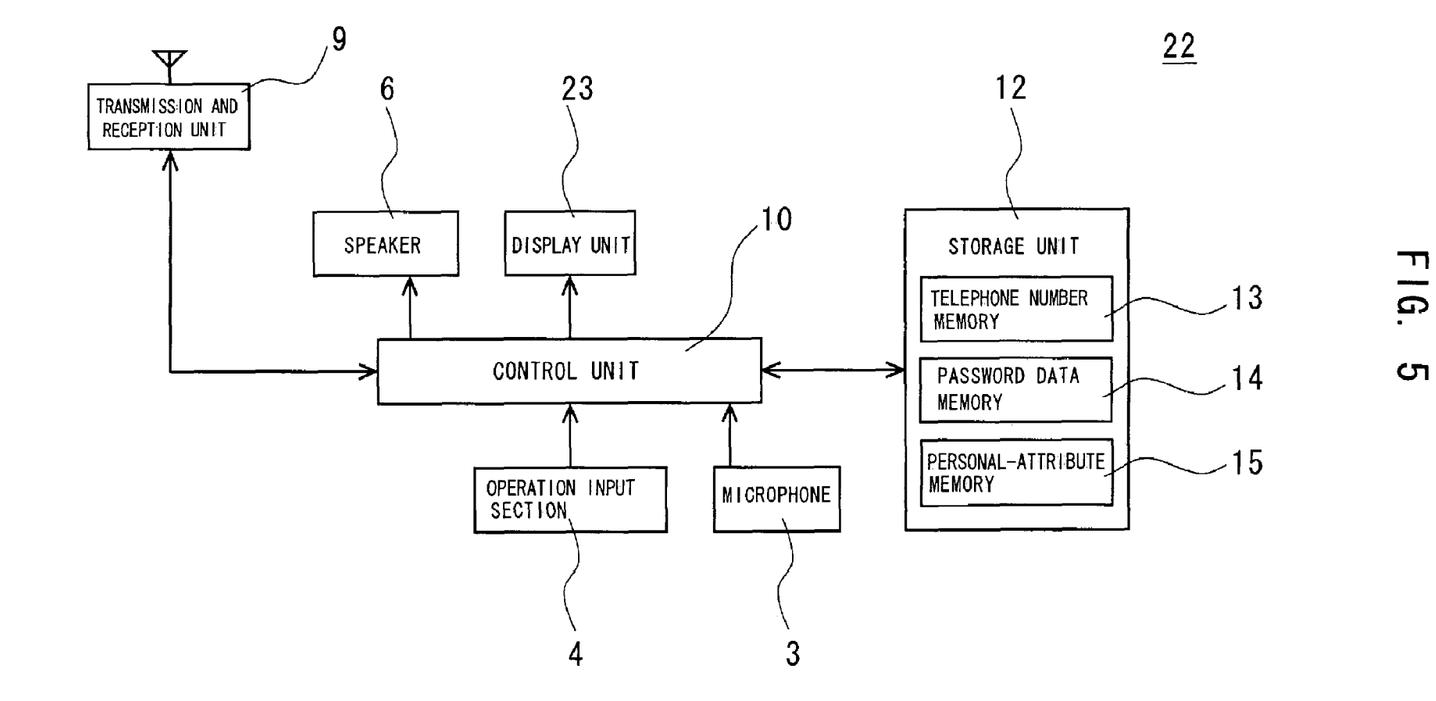
FIG. 5 is a block diagram in which the configuration of a portable telephone according to another embodiment of the present invention is shown.

FIG. 5 is a block diagram in which the configuration of a portable telephone 22 according to another embodiment of the present invention is shown. This portable telephone 22 is provided with a transmission and reception unit 9, a control unit 10, a speaker 6, an operation input section 4, a microphone 3, and a storage unit 12 in the same manner as for the portable telephone 1 shown in FIG. 2. The storage unit 12 is provided with a telephone number memory 13, a password-data memory 14, and a personal-attribute memory 15. Each of the memories 13, 14, and 15 is a memory whose contents cannot be overwritten (a ROM). The subscriber telephone number of the user is stored in the telephone number memory 13. This telephone number is individual-identifying information. The telephone number is stored by a mobile telephone company prior to the portable telephone being delivered to the user. Password data (a password) is stored in the password-data memory 14. This password data is also stored by the mobile telephone company prior to the portable telephone 22 being delivered to the user. The portable telephone 22 may be designed so that this password data can be changed only when a default password data is input. Personal attribute data, such as gender, date of birth, and so forth, is stored in the personal attribute memory 15. Storage of this personal attribute data is performed by the mobile telephone company based on the information entered on an application form that the user filled out when making a contract with the mobile telephone company.

This portable telephone 22 is also provided with a display unit 23. The display unit 23 is provided with a function for displaying codes. A bar code, a two-dimensional bar code in which a bar code extends in two dimensions, and a code in which color is added to these, as mentioned above, may be used as the codes.

Figure 6:
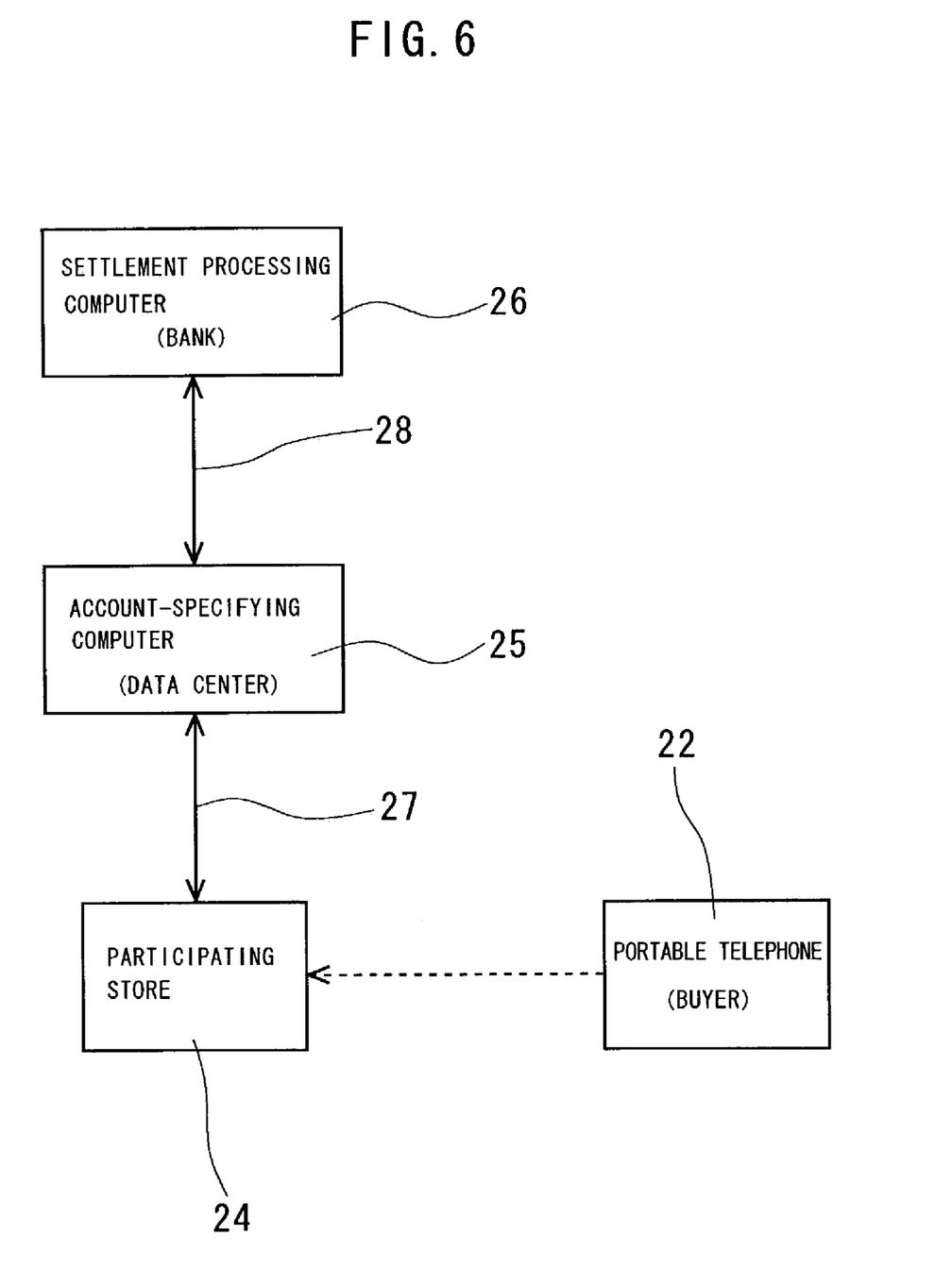
FIG. 6 is a conceptual diagram showing a sales amount settlement system in which the portable telephone in FIG. 5 is used.

FIG. 6 is a conceptual diagram showing a sales amount settlement system in which the portable telephone 22 in FIG. 5 is used. In this figure, the portable telephone 22, a participating store 24, an account-specifying computer 25 in a data center, and a settlement processing computer 26 in a bank are shown. The user of the portable telephone 22 is a buyer who purchases products by using this sales amount settlement system.

A bank account of the buyer is opened in the bank. Moreover, the settlement processing computer 26 of the bank holds a record of charge instructions for the account, determines whether or not it is possible to perform settlement corresponding to the charge instructions, reports on whether or not settlement is possible for the charge instructions, and so on.

A database in which a correspondence is made between the telephone number of the buyer and the account that he or she has opened in the bank is stored in the account-specifying computer 25 in the data center. This database is created based on the details written in the automatic charge payment form submitted to the mobile telephone company (not shown in the drawing) by the buyer at contracting time. Moreover, a database in which a correspondence is made between the participating store 24 and a payment account is also stored in the account-specifying computer 25.

The participating store 24 provides goods for customers. This participating store 24 includes not only people selling goods that are material objects, but also people providing services. This participating store 24 joins-this payment settlement system by paying a participation fee. The participating store 24 has a POS terminal. This POS terminal is provided with a code reader for scanning the codes displayed on the display unit 23 of the portable telephone 22.

The participating store 24 and the account-specifying computer 25 are connected together via a wired or wireless line 27 (preferably a private leased line). Furthermore, the account-specifying computer 25 and the settlement processing computer 26 are also connected together via a wired or wireless line 28 (preferably a private leased line).

Figure 7:
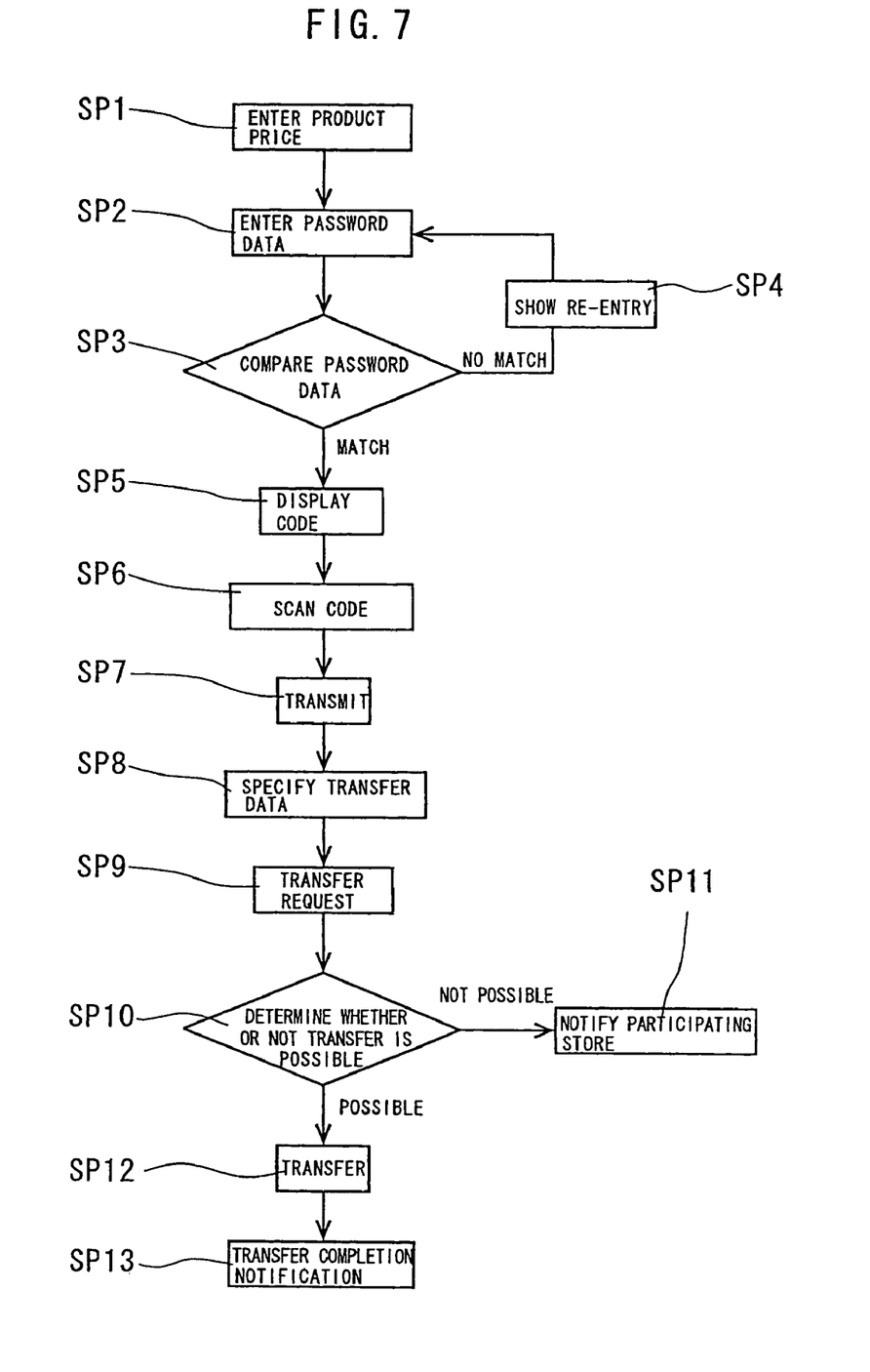
FIG. 7 is a flow chart showing a sales amount settlement method in which the portable telephone in FIG. 5 is used.

FIG. 7 is a flowchart showing the sales amount settlement method in which the portable telephone 22 of FIG. 5 is used. In this sales amount settlement method, first the sale amount of the product which the buyer purchases is input into the POS terminal in the participating store 24 (SP1). After consenting to this sale amount, the buyer operates the operation input section 4 (a ten-key) of his or her portable telephone 22 to enter password data (SP2). The control unit 10 performs a comparison of the entered password data and password data stored in advance in the password-data memory 14 (SP3). If the password data does not match, a message to that effect is displayed on the display unit 23 of the portable telephone 22 and re-entry is prompted (SP4). The portable telephone 22 may be designed in such a way that further input is prevented if the password data is erroneously entered a certain number of times (for example, three times). By comparing the password data, use of the portable telephone 22 by a person other than the owner is prevented. Furthermore, when the owner inputs the password data, it is preferable from the point of view of preventing disclosure of the password data that the telephone be designed in such a way that the digits of the input data are displayed only as symbols, such as asterisks, for example.

If the password data is input correctly, the telephone number of the buyer, which is stored in the telephone number memory 13, is displayed on the display unit 23 in an encoded form (SP5). Of course, the telephone number can also be input by the buyer each time. The sales clerk of the participating store 24 scans the code on the display unit 23 using the code reader (SP6). The scanned telephone number (that is to say, the individual-identifying information), together with the product price and the participating store code, is transmitted to the account-specifying computer 25 via the line 27 (SP7).

Processing means (a CPU) of the account-specifying computer 25 specifies transfer data based on the database stored in the storage means (a hard disk) (SP8). This transfer data includes the bank account of the buyer (the bank name, the branch name, the account number, and so on), the payment account of the participating store 24, the transfer amount (in other words, the sale amount of the product), and so forth. The bank account of the buyer is specified based on the telephone number, which is the individual-identifying information. The payment account of the participating store 24 is specified based on the participating store code.

Next, the account-specifying computer 25 transmits the transfer data to the settlement processing computer 26 of the bank via the line 28 and gives a transfer instruction (SP9). After receiving the transfer instruction, processing means of the settlement processing computer 26 carries out a balance check of the buyer's bank account, and determines on the basis of this whether or not it is possible to perform a transfer (SP10). Then, in the case where it is not possible to perform a transfer because of insufficient funds, for example, the settlement processing computer 26 reports that fact to the participating store 24 via the lines 28 and 27 (SP11). In the case where it is possible to perform a transfer, the settlement processing computer 26 gives a transfer instruction to the bank (not shown) of the participating store 24 to carry out the transfer (SP12).

After completion of the transfer, the settlement processing computer 26 immediately transmits a transfer completion notification to the participating store 24 via the lines 28 and 27 (SP13). Accordingly, the sales clerk in the participating store 24 hands over the goods to the buyer there and then.

In this sales amount settlement method, since the settlement is done via the lines 27 and 28, which are highly secure, transactions can be carried out safely. Therefore, there is little need to encode the information and so on, as in electronic settlement using the Internet, for example.

An individual may be identified by means of data other than a telephone number (for example, a subscriber ID). Moreover, the portable telephone 22 may be designed such that, as well as entering the password data, a bank account password can be entered via the operation input section 4.

The portable telephone may be designed so that the settlement is carried out only when the buyer enters the sales amount via the operation input section 4 and this sales amount agrees with the sales amount that the store clerk enters into the POS terminal. Accordingly, the buyer is prevented from mistakenly purchasing an expensive item that her or she did not intend to.

The personal-attribute data stored in the personal-attribute memory 15 may be displayed on the display unit 23 in an encoded form. This personal-attribute data is also scanned into the POS terminal by the code reader. Based on the scanned personal-attribute data, the selection of purchase restrictions and prices can be carried out.

A portable telephone is described above as one example of the present invention; however, in the same way, a mobile telephone apparatus such as a PHS terminal, a car telephone, a compact computer provided with a telephone function, and so on, may also be used for sales amount settlement.

INDUSTRIAL APPLICABILITY

As described above, the mobile telephone apparatus of the present invention is suitable for online sales amount settlement. A sales amount settlement method in which this mobile telephone apparatus is used has excellent security for transactions.

The invention claimed is:

1. A sales amount settlement method comprising:
   A) inputting product-related information related to products a buyer wants to purchase at a participating store, said product-related information being input by the buyer into a mobile telephone operated by the buyer;
   B) transmitting, via a private leased line, to a mobile telephone company of the mobile telephone, individual-identifying information of the buyer together with the product-related information input in step A;
   C) determining whether or not it is possible to pay a sales amount for the products the buyer wants to purchase from a funds account of the buyer based on the individual-identifying information transmitted together with the product-related information in step B such that the buyer can purchase the products; and
   D) transferring the sales amount to the participating store when it is possible to pay the sales amount,
   wherein the individual-identifying information of the buyer together with the product-related information is transmitted via the private leased line directly from the mobile terminal to the mobile telephone company, and
   wherein the product-related information further includes information about the participating store,
   wherein the step B comprises:
   entering password data for the buyer into the mobile telephone;
   determining, via the mobile telephone, whether or not the entered password data and password data stored in a memory of the mobile telephone match; and
   transmitting the individual-identifying information of the buyer together with the product-related information to the mobile telephone company when the password data match.

2. The method according to claim 1, wherein the individual-identifying information transmitted in the step B is a telephone number stored in a memory of the mobile telephone.

3. The method according to claim 1, further comprising:
   E) transmitting a sales amount transfer completion notification to the mobile telephone after the step D) is completed.

4. The method according to claim 1, wherein the product-related information provided in the step A is provided to the buyer as a product code which is shown in a product catalog distributed by the participating store.

5. The method according to claim 1, wherein the product-related information provided in the step A is provided by the participating store to the buyer as encoded data, and the product-related information is input to the mobile telephone via a scanner provided in the mobile telephone.

6. The method according to claim 1, wherein the private leased line includes a packet communication line.

7. The method according to claim 1, wherein the store information includes a participating store code such that the participating store code can be used to identify and distinguish a payment account of the participating store from a payment account of other participating stores.

8. A sales amount settlement method comprising:
   displaying individual-identifying information of a buyer buying products at a participating store on a display unit of a mobile telephone operated by the buyer;
   scanning the individual-identifying information displayed on the mobile telephone at a terminal in a participating store;
   transmitting the individual-identifying information, together with sales amount information of a product that the buyer purchases from the terminal to an account-specifying computer;
   verifying, via the account-specifying computer, whether the buyer is able to purchase the product based on the individual-identifying information; and
   transferring funds from a money account of the buyer to the participating store if it is verified the buyer is able to purchase the product,
   wherein the individual-identifying information of the buyer is encoded,
   wherein the encoded individual-identifying information comprises at least one code,
   wherein the code comprises at least one of a two-dimensional code and a colored code,
   wherein the method further comprises:
   before the transferring step, entering by the buyer, password data into the mobile telephone; and
   determining if the password data entered by the buyer matches password data stored in a memory of the mobile telephone, and
   wherein the displaying step only displays the individual-identifying information on the display unit of the mobile telephone apparatus if the password data matches.

9. The method according to claim 8, further comprising:
   notifying the terminal in the participating store about a completion of funds transferred from the account-specifying computer to the participating store.

10. A mobile telephone apparatus comprising:
    an input section configured to input product-related information related to products a buyer wants to purchase at a participating store;
    a transmitting unit configured to transmit, via a private leased line, to a mobile telephone company of the mobile telephone apparatus, individual-identifying information of the buyer together with the product-related information input into the input section; and
    a receiving unit configured to receive information from an external computer about whether or not it is possible to pay a sales amount for the products the buyer wants to purchase from a funds account of the buyer based on the individual-identifying information transmitted together with the product-related information,
    wherein the individual-identifying information of the buyer together with the product-related information is transmitted via the private leased line directly from the mobile terminal to the mobile telephone company,
    wherein the product-related information further includes information about the participating stores,
    wherein the apparatus further comprises:
    a memory section configure to store a password for operating the mobile telephone apparatus; and
    a control unit configure to determine whether or not password data entered by the buyer matches the password data stored in the memory section, and
    wherein the transmitting unit only transmits the individual-identifying information of the buyer together with the product-related information to the mobile telephone company when the password data match.

11. The apparatus according to claim 10, wherein the transmitted individual-identifying information is a telephone number stored in the memory of the mobile telephone apparatus.

12. The apparatus according to claim 10, further comprising: a display unit configured to display a sales amount transfer completion notification when funds are transferred from the funds account of the buyer to the participating store.

13. The apparatus according to claim 10, wherein the product-related information comprises a product code which is shown in a product catalog distributed by the participating store.

14. The apparatus according to claim 10, wherein the product-related information provided is provided by the participating store to the buyer as encoded data, and the product-related information is input to the mobile telephone via a scanner provided in the mobile telephone.

15. The apparatus according to claim 10, wherein the private leased line includes a packet communication line.

16. The apparatus according to claim 10, wherein the store information includes a participating store code such that the participating store code can be used to identify and distinguish a payment account of the participating store from a payment account of other participating stores.

17. A mobile telephone apparatus comprising:
a scanning section configure to scan products at a participating store; and
a display unit configured to display individual-identifying information of a buyer buying the products at the participating store such that the participating store may scan the displayed individual-identifying information of the buyer,
wherein the individual-identifying information comprises a code, and
wherein the bar code comprises at least one of a two-dimensional code and a colored code,
wherein the apparatus further comprises:
a transmitting unit configured to transmit to a mobile telephone company of the mobile telephone apparatus, an identification of the buyer together with product-related information scanned into the scanning section;
a receiving unit configured to receive information from an external computer about whether or not it is possible to pay a sales amount for the products scanned at the participating store from a funds account of the buyer based on the identification information transmitted together with the product-related information such that the buyer can purchase the products without interaction with a checkout station of the participating store;
a memory section configured to store a password for operating the mobile telephone apparatus; and
a control unit configured to determine whether or not password data entered by a user of the mobile telephone apparatus matches the password data stored in the memory section, and
wherein the transmitting unit only transmits the identification information of the buyer together with the product-related information to the mobile telephone company when the password data match.

18. The apparatus according to claim 17, wherein the transmitted identification information is a telephone number stored in the memory of the mobile telephone apparatus.

19. The apparatus according to claim 17, wherein the display unit further displays a sales amount transfer completion notification when funds are transferred from the funds account of the buyer to the participating store.

20. The apparatus according to claim 17, wherein the product-related information comprises a product code which is shown in a product catalog distributed by the participating store.

* * * * *